United States Patent
Raju et al.

(10) Patent No.: US 11,507,545 B2
(45) Date of Patent: Nov. 22, 2022

(54) SYSTEM AND METHOD FOR MIRRORING A FILE SYSTEM JOURNAL

(71) Applicant: EMC IP Holding Company LLC, Hopkinton, MA (US)

(72) Inventors: Suraj Raju, Issaquah, WA (US); Max Laier, Seattle, WA (US); Ron Steinke, Tacoma, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 159 days.

(21) Appl. No.: 16/943,576

(22) Filed: Jul. 30, 2020

(65) Prior Publication Data
US 2022/0035772 A1   Feb. 3, 2022

(51) Int. Cl.
*G06F 16/18* (2019.01)
*G06F 16/17* (2019.01)
*G06F 16/182* (2019.01)

(52) U.S. Cl.
CPC ...... *G06F 16/1865* (2019.01); *G06F 16/1734* (2019.01); *G06F 16/1815* (2019.01); *G06F 16/1824* (2019.01)

(58) Field of Classification Search
CPC ............. G06F 16/1865; G06F 16/1734; G06F 16/1815; G06F 16/1824
USPC ...................................................... 707/703
See application file for complete search history.

(56) References Cited

U.S. PATENT DOCUMENTS

| | | | | |
|---|---|---|---|---|
| 6,160,796 A * | 12/2000 | Zou | ...................... | H04L 12/2805 370/257 |
| 6,578,160 B1 * | 6/2003 | MacHardy, Jr. | ..... | G06F 11/0709 714/E11.13 |
| 6,668,262 B1 * | 12/2003 | Cook | .................. | G06F 11/1004 |
| 7,149,858 B1 * | 12/2006 | Kiselev | ................. | H04L 67/565 711/163 |
| 7,617,259 B1 * | 11/2009 | Muth | .................. | G06F 11/2066 |
| 7,739,546 B1 * | 6/2010 | Rodrigues | ........... | G06F 11/1662 714/13 |
| 7,805,632 B1 * | 9/2010 | Luke | ................... | G06F 11/1471 714/36 |

(Continued)

FOREIGN PATENT DOCUMENTS

WO   WO-2011002169 A2 *   1/2011   .......... G06F 11/2023

OTHER PUBLICATIONS

Trimbee, "Dell EMC Powerscale ONEFS: A Technical Overview," Dell Technologies, White Paper, Jun. 2020, 42 pages.

(Continued)

*Primary Examiner* — Phuong Thao Cao
(74) *Attorney, Agent, or Firm* — Amin, Turocy & Watson, LLP

(57) ABSTRACT

Systems and methods for mirroring a file system journal are described herein. A method as described herein can include receiving, by a system operatively coupled to a processor, transactional file system updates corresponding to a write operation to be performed at a first node of the system; transferring, by the system, the transactional file system updates from an initiator node of the system to a first journal at the first node and a second journal at a second node of the system that is logically distinct from the first node and the initiator node; and committing, by the system, the transactional file system updates to the first journal and the second journal.

20 Claims, 12 Drawing Sheets

(56) References Cited

U.S. PATENT DOCUMENTS

| | | | | |
|---|---|---|---|---|
| 7,831,861 | B1* | 11/2010 | Greene | G06F 11/1469 707/685 |
| 7,873,619 | B1 | 1/2011 | Faibish et al. | |
| 8,775,381 | B1* | 7/2014 | McCline | G06F 16/275 707/658 |
| 9,020,987 | B1* | 4/2015 | Nanda | G06F 16/1734 707/821 |
| 9,069,790 | B2* | 6/2015 | Lord | G06F 16/164 |
| 9,367,579 | B1* | 6/2016 | Kumar | G06F 16/2365 |
| 9,652,766 | B1* | 5/2017 | Hattikudru | G06F 16/2379 |
| 9,892,041 | B1* | 2/2018 | Banerjee | G06F 16/172 |
| 10,037,251 | B1* | 7/2018 | Bono | G06F 11/2097 |
| 10,289,690 | B1* | 5/2019 | Bono | G06F 16/184 |
| 10,635,552 | B1* | 4/2020 | Raju | G06F 16/1865 |
| 10,719,481 | B1* | 7/2020 | Baruch | G06F 16/1734 |
| 2002/0103816 | A1* | 8/2002 | Ganesh | G06F 11/2079 714/E11.12 |
| 2002/0143888 | A1* | 10/2002 | Lisiecki | H04L 67/1095 709/217 |
| 2003/0158908 | A1* | 8/2003 | Jacobs | H04L 67/1095 709/214 |
| 2006/0136685 | A1* | 6/2006 | Griv | G06F 11/2064 714/E11.107 |
| 2010/0235326 | A1* | 9/2010 | Fashchik | G06F 11/2071 707/E17.005 |
| 2013/0198142 | A1* | 8/2013 | Madhavarapu | G06F 11/2097 707/658 |
| 2015/0006846 | A1 | 1/2015 | Youngworth et al. | |
| 2017/0091262 | A1* | 3/2017 | Beard | G06F 16/1734 |
| 2017/0104820 | A1* | 4/2017 | Golander | H04L 67/1097 |
| 2019/0243732 | A1* | 8/2019 | Tati | G06F 3/0619 |
| 2019/0286613 | A1* | 9/2019 | Bramante | G06F 7/00 |
| 2020/0012442 | A1* | 1/2020 | Yang | H04L 29/08 |
| 2020/0348851 | A1* | 11/2020 | Grosman | G06F 3/067 |
| 2021/0034709 | A1* | 2/2021 | Patwardhan | G06F 16/1756 |
| 2021/0382799 | A1* | 12/2021 | Kawaguchi | G06F 16/1815 |

OTHER PUBLICATIONS

Trimbee, "Dell EMC Powerscale ONEFS Cluster Composition, Quorum, and Group State," Dell Technologies, White Paper, Jun. 2020, 21 pages.

Non-Final Office Action received for U.S. Appl. No. 17/083,955 dated Sep. 15, 2022, 26 pages.

* cited by examiner

SYSTEM AND METHOD FOR MIRRORING A FILE SYSTEM JOURNAL

TECHNICAL FIELD

The subject application is related to data storage, and more particularly, to techniques for data protection in a data storage system.

BACKGROUND

A file system journal can be utilized to provide crash consistency for a data storage system. For instance, a write operation that would result in updates to one or more data or metadata blocks of a drive associated with the system can first be logged on a journal associated with that drive. Once the relevant file system updates have been made durable and persistent on the journal media, the logged writes can subsequently be transferred to the drive in the background. As a result, the journal can be utilized for drive recovery in the event of a failure of the write operation due to crashes, computing node failures, or other causes.

If a file system journal becomes lost or inaccessible prior to recorded file system updates completing successfully, the loss of the journal can result in a corresponding loss or inaccessibility of the data on the corresponding drive(s). As a result, it is desirable to implement techniques that improve the resiliency and security of data recorded on a file system journal.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system can include a memory that stores executable components and a processor that executes the executable components stored in the memory. The executable components can include a write processing component that generates transactional file system updates corresponding to a write operation to be performed at a first participant node of the data storage system. The computer executable components can further include a journal transfer component that transfers the transactional file system updates from an initiator node of the data storage system to a first journal at the first participant node and a second journal at a second participant node of the data storage system that is logically distinct from the first participant node and the initiator node. The computer executable components can also include a journal commit component that facilitates commitment of the transactional file system updates to the first journal and the second journal.

In another aspect, a method is described herein. The method can include receiving, by a system operatively coupled to a processor, transactional file system updates corresponding to a write operation to be performed at a first node of the system. The method can additionally include transferring, by the system, the transactional file system updates from an initiator node of the system to a first journal at the first node and a second journal at a second node of the system that is logically distinct from the first node and the initiator node. The method can further include committing, by the system, the transactional file system updates to the first journal and the second journal.

In an additional aspect, a non-transitory machine-readable medium including computer executable instructions is described herein. The instructions, when executed by a processor of a data storage system, can facilitate performance of operations including receiving file system updates and transaction information corresponding to a write operation directed to a primary participant node of the data storage system; transferring the file system updates and the transaction information from an initiator node of the data storage system to a first journal at the primary participant node and a second journal at a secondary participant node of the data storage system that is logically distinct from the first participant node and the initiator node; and committing the file system updates and the transaction information to the first journal and the second journal.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

As noted above, a distributed data storage system with file system journaling can be configured such that any write from the file system to a drive in the data storage system can initially be processed on a journal associated with the drive. Subsequently, e.g., in the background, writes recorded on a journal can be transferred to the corresponding drive. As a result, any loss or inaccessibility of the journal can result in a corresponding loss or inaccessibility of the data on the drive.

In an aspect, the contents of a file system journal can include transactional file system updates to the drives associated with the journal. These transactional file system updates can, in turn, include transaction information, e.g., two-phase commit transaction information, and the file system updates (e.g., to the block(s) of the drive(s) associated with the updates). To facilitate improved protection of the contents of a file system journal, various aspects herein can be utilized to mirror both the transaction information and the file system updates that are affiliated with the corresponding transaction across multiple failure domains, e.g., as will be described in further detail below. As a result, in the event of a journal failure on a node, the lost journal contents can be recovered from the created mirror. Additionally, a mirrored file system journal can be used to rebuild the journal on a given node, thereby enabling continuation of progress on any unresolved transactions as well as reconstruction of the corresponding file system updates.

By implementing file system journal mirroring as described herein, various advantages that can improve the functionality of a computing system can be realized. These advantages can include, but are not limited to, the following. Computing resources (e.g., processor cycles, memory usage, power consumption, network bandwidth utilization, etc.) associated with recovery from disk and/or journal failures can be reduced. Integrity of stored data can be improved in the event of a disk or journal failure. Storage overhead associated with redundancy protection for non-journal data can be reduced. Other advantages are also possible.

Figure 1:
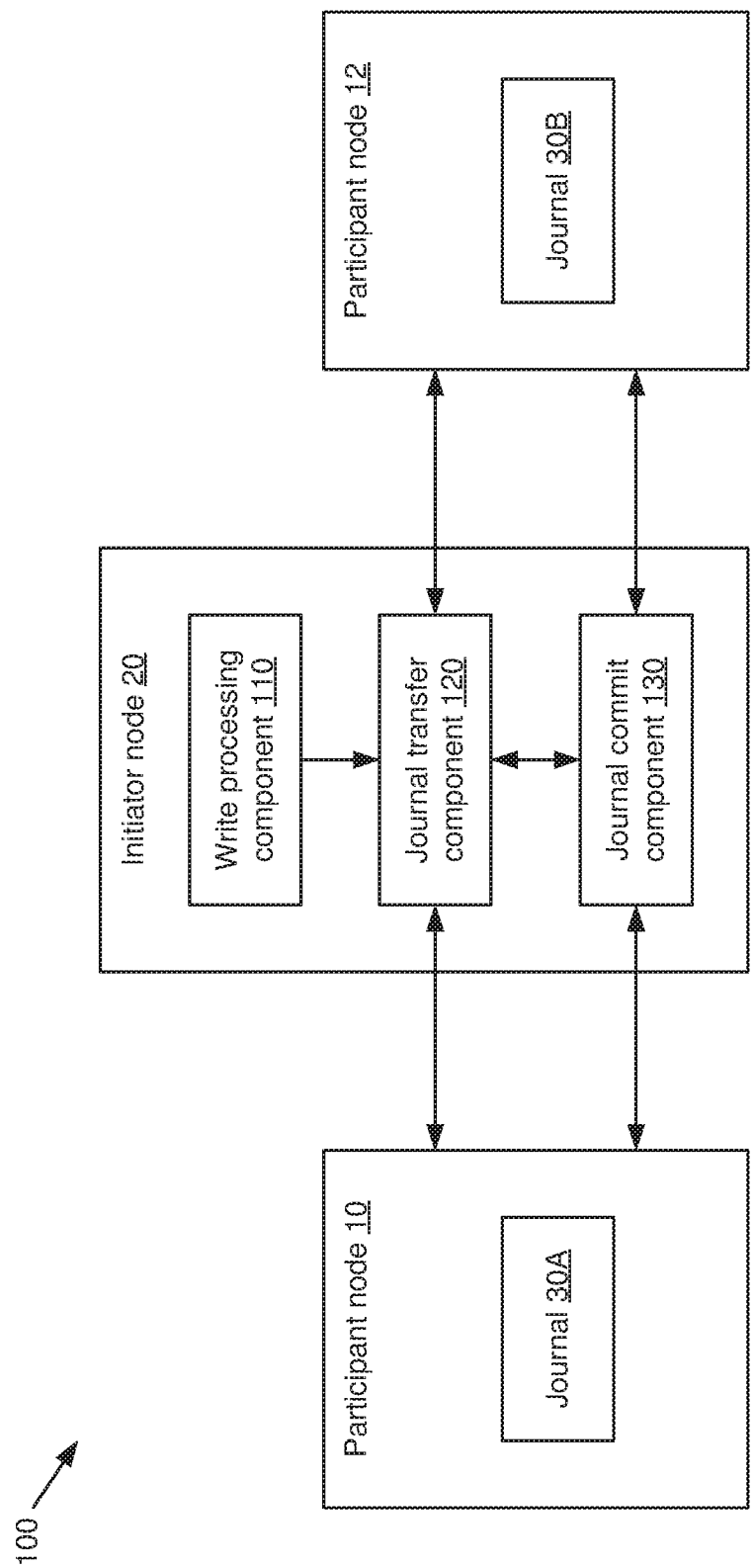
FIG. 1 is a block diagram of a system that facilitates mirroring a file system journal in accordance with various aspects described herein.

With reference now to the drawings, FIG. 1 illustrates a block diagram of a system 100 that facilitates mirroring a file system journal in accordance with various aspects described herein. As shown in FIG. 1, system 100 includes a write processing component 110, a journal transfer component 120, and a journal commit component 130, which can operate as described in further detail below. In an aspect, the components 110, 120, 130 of system 100 can be implemented in hardware, software, or a combination of hardware and software. By way of example, the components 110, 120, 130 can be implemented as computer-executable components, e.g., components stored on a memory and executed by a processor. An example of a computer architecture including a processor and a memory that can be used to implement the components 110, 120, 130, as well as other components as will be described herein, is shown and described in further detail below with respect to FIG. 13.

In an aspect, the components 110, 120, 130 can be associated with a computing node and/or other computing device associated with a file storage system and/or other data storage system. For instance, the components 110, 120, 130 as shown in system 100 are each associated with an initiator node 20 in system 100 that can be utilized to initiate write operations within system 100, e.g., as described in further detail below. Also or alternatively, the components 110, 120, 130, and/or other components as will be described in further detail below, can be implemented within other computing nodes or devices, such as the participant nodes 10, 12 further shown in system 100 and/or other suitable devices. Additionally, it should be appreciated that the components 110, 120, 130 of system 100, as well as additional other components as will be described in further detail below, can be implemented at a same computing device (node) and/or distributed among multiple computing devices (nodes).

Returning to FIG. 1, the write processing component 110 of system 100 can generate and/or otherwise obtain transactional file system updates that correspond to a write operation to be performed at a first participant node 10 of system 100. A "write operation" for which file system updates can be generated or obtained by the write processing component 110 can include any suitable operation that results in the creation or modification of any data stored at the first participant node 10, e.g., in one or more data blocks associated with a drive or group of drives at the first participant node 10. By way of example, a write operation could include creation of a new file, object or other data structure as well as any modification to any existing file, object or other data structure. In an aspect, the write processing component 110 can similarly create and/or obtain transactional file system updates corresponding to deletion or removal of a file, object or other data structure from the first participant node 10 using techniques that are similar to those described herein.

In another aspect, the transactional file system updates processed by the write processing component 110 can include updates to one or more data and/or metadata blocks, e.g., data and/or metadata blocks to which a write operation is directed as well as transaction information associated with the write operation. Structures that can be utilized for transactional file system updates are described in further detail below.

As further shown in FIG. 1, the journal transfer component 120 of system 100 can transfer transactional file system updates received from the write processing component 110 from an initiator node 20, e.g., a node of system 100 from which the underlying write operation originates, to a first journal 30A at the first participant node 10 and a second journal 30B at a second participant node 12 that is logically distinct from the first participant node 10. By mirroring the file system updates across journals 30A, 30B at logically distinct participant nodes 10, 12, the journal transfer component 120 can facilitate the recording of file system updates and underlying transaction data across multiple fault domains, thereby increasing the resiliency of the respective journals 30A, 30B to journal or node failures. While only one initiator node 20 and two participant nodes 10, 12 are shown in FIG. 1, it should be appreciated that system 100 could utilize any suitable number of initiator nodes 20 and/or participant nodes 10, 12.

As additionally shown in FIG. 1, the journal commit component 130 can facilitate commitment of the transactional file system updates transferred by the journal transfer component 120 at the respective journals 30A, 30B of the participant nodes 10, 12. In an aspect, the journal commit component 130 can facilitate committing the transactional file system updates to the respective journals 30A, 30B via a two-phase commit (2PC) transaction, such as a 2PC version 2 (2PCv2) transaction. An example of a 2PC transaction that can be utilized by the journal commit component 130 is described in further detail below with respect to FIG. 5.

While the participant nodes 10, 12 and the initiator node 20 shown in system 100 are logically distinct and are illustrated as distinct entities, it should be appreciated that the participant nodes 10, 12 and the initiator node 20 need not be physically distinct. For instance, the participant nodes 10, 12 and the initiator node 20 could be housed by a common physical chassis and/or other apparatus despite being logically separate system nodes. Alternatively, respective ones of the nodes 10, 12, 20 could be located in different physical devices and configured to communicate with each other via any suitable wired or wireless communication protocol.

Additionally, in a distributed file system, the functionality of a participant node 10, 12 can be distributed among multiple physical devices. For instance, a file that is the subject of a file system transaction (e.g., file creation/modification/removal, etc.) can be associated with a corresponding set of data and/or metadata blocks that can be stored across a given physical cluster of system 100. To this end, the initiator node 20, e.g., via the write processing component 110 and/or other suitable mechanisms, can determine the files and/or blocks that will be updated as the result of a given transaction and subsequently identify the physical devices and/or clusters on which those blocks are located. These identified devices and/or clusters, in turn, can be designated as the participant nodes 10, 12 shown in system 100.

In an aspect, system 100 as shown in FIG. 1 can be utilized to employ a hardware agnostic, initiator-driven journal mirroring paradigm. To restate the above, the initiator node 20 of system 100 can send mirror copies of file system updates to an additional set of different participants, e.g., one or more primary participant nodes 10 and one or more secondary participant nodes 12. As a result, for each primary participant, an additional participant on a separate journal failure domain can be assigned. As a result, in the event of a journal failure of a primary participant, a mirror copy of its journal can be available at the additional (secondary) participant. As will be discussed in further detail below with respect to FIG. 5, secondary participants can be logically separate 2PCv2 participants, and therefore are isolated and operate in parallel with respective other participants involved in the transaction.

Figure 2:
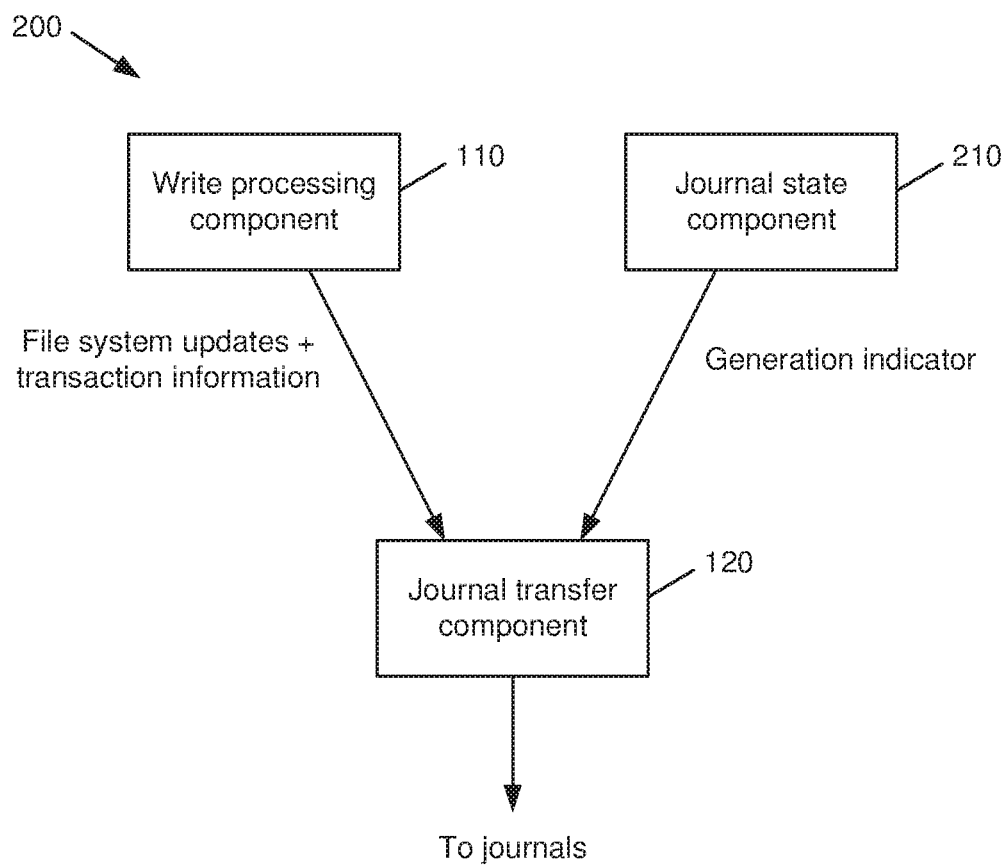
FIG. 2 is a block diagram of a system that facilitates management and communication of file system journal state information in accordance with various aspects described herein.

Turning now to FIG. 2, a block diagram of a system 200 that facilitates management and communication of file system journal state information in accordance with various aspects described herein is illustrated. Repetitive description of like elements employed in other embodiments described herein is omitted for brevity. As shown in FIG. 2, file system updates, transaction information, and/or other appropriate information can be provided to the journal transfer component 120 by the write processing component 110, e.g., as described above with respect to FIG. 1. In addition, system 200 includes a journal state component 210 that can obtain a generation indicator that is associated with system 200, e.g., in response to initiation of a write operation as handled by the write processing component 110. The journal update component 120 shown in system 200 can then transfer the generation indicator obtained from the journal state component 210 along with transactional file system updates as provided by the write processing component 110 to one or more journals, e.g., journals 30A, 30B as described above with respect to FIG. 1.

In an aspect, a generation indicator as shown in system 200 can be associated with each primary journal in a data storage system to track state changes associated with the primary journal. In one example, the generation indicator can be a numeric value (e.g., a generation number), which can be configured as a monotonically increasing value and/or in any other suitable manner Other types of generation indicators, such as timestamps or the like, could also be used.

In a further aspect, the journal state component 210 can utilize group management protocol (GMP) to publish the generation indicator of the primary journal to its associated group. Additionally, the journal state component 210 can be configured to update the generation indicator corresponding to a given primary journal in response to a change of operational state of at least one participant associated with the primary journal, e.g., a primary participant to which the primary journal belongs and/or one or more secondary participants on which the primary journal is mirrored. For instance, the journal state component 210 can update the generation number or indicator of the primary journal on a secondary participant disconnect (e.g., a GMP split operation), secondary participant connect (e.g., a GMP merge operation), a secondary participant entering a read-only mode (e.g., via a GMP config operation), etc.

Figure 3:
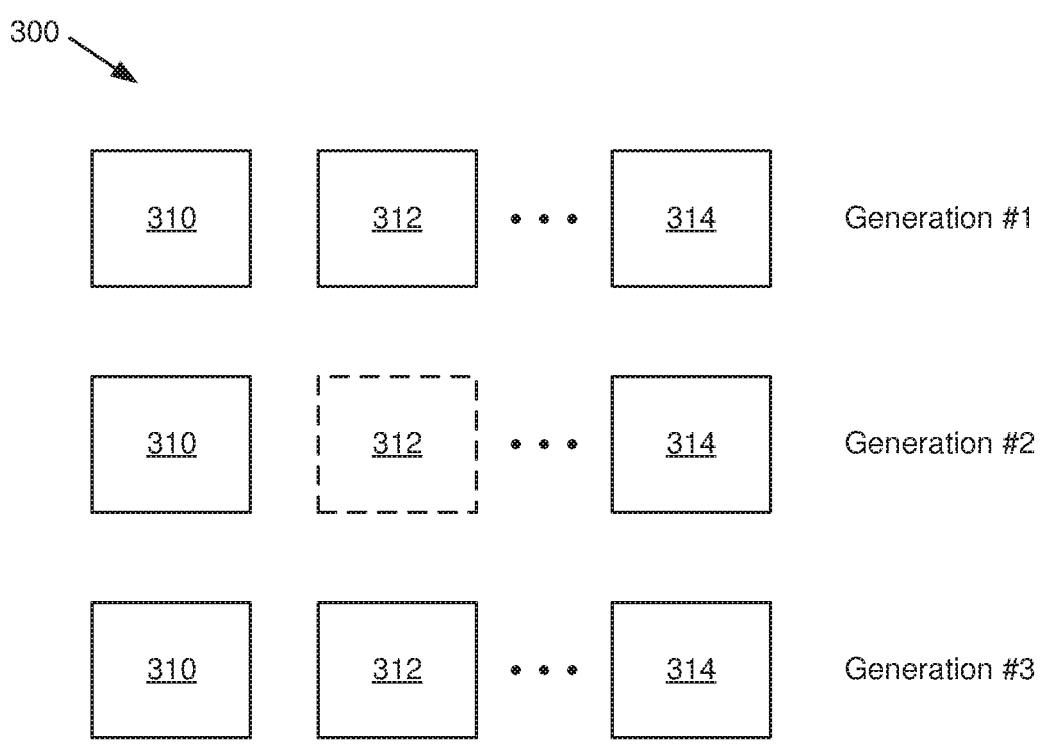
FIG. 3 is a diagram depicting example journal state updates that can be managed by the system of FIG. 2 in accordance with various aspects described herein.

By way of illustrative example, diagram 300 in FIG. 3 shows changes to a generation indicator that can be performed for a group of three nodes 310, 312, 314 that are associated with a given primary journal. As shown by diagram 300, nodes 310, 312 and 314 are initially each in an operational state and are associated with an initial generation number, e.g., generation 1. As further shown by diagram 300, node 312 subsequently becomes unavailable (e.g., by going offline, entering a read-only mode, etc., as denoted by a dashed outline), and as a result the generation number is updated, e.g., to generation 2. Once node 312 returns to an available state as additionally shown in diagram 300, the generation number can again be updated, e.g., to generation 3.

As shown by diagram 300, on any disconnection of a secondary participant, the corresponding primary participant can update its generation indicator (e.g., by bumping its generation number, etc.) as part of the ensuing GMP split. On any secondary participant reconnecting, the corresponding primary participant can update its generation indicator and publish the generation change to the group via the corresponding GMP merge. Any transaction resolution or cleanup blocked on the disconnected secondary participant can happen, e.g., on Remote Block Manager (RBM) connect callbacks. On reconnect, a secondary participant can also query the state of the transactions from the primary participant using RBM connect callbacks and/or other means, and clean up any flushed transactions. In an aspect, RBM connect callbacks, as well as other RBM messages, can be utilized to implement remote procedure call (RPC) in a distributed file system.

In an aspect, a generation indicator corresponding to a primary journal can be stored outside of the respective failure domains of each associated primary and secondary journal. For instance, as shown by diagram 400 in FIG. 4, a generation indicator 40 can be stored at an initiator node 20 and one or more participant nodes 10, 12 outside of the journals 30A, 30B respectively associated with the participant nodes 10, 12. By way of example, the generation indicator 40 for a journal can be stored in a node state block (NSB), which is a per-node disk block that can be mirrored across respective drives in a given node and can be used to hold the current journal generation and/or other bootstrapping information. Also or alternatively, the generation indicator can be stored in any other suitable data or metadata block(s) that are distinct from the journal and mirrored across the nodes 10, 12, 20 and their respective drives.

Figure 5:
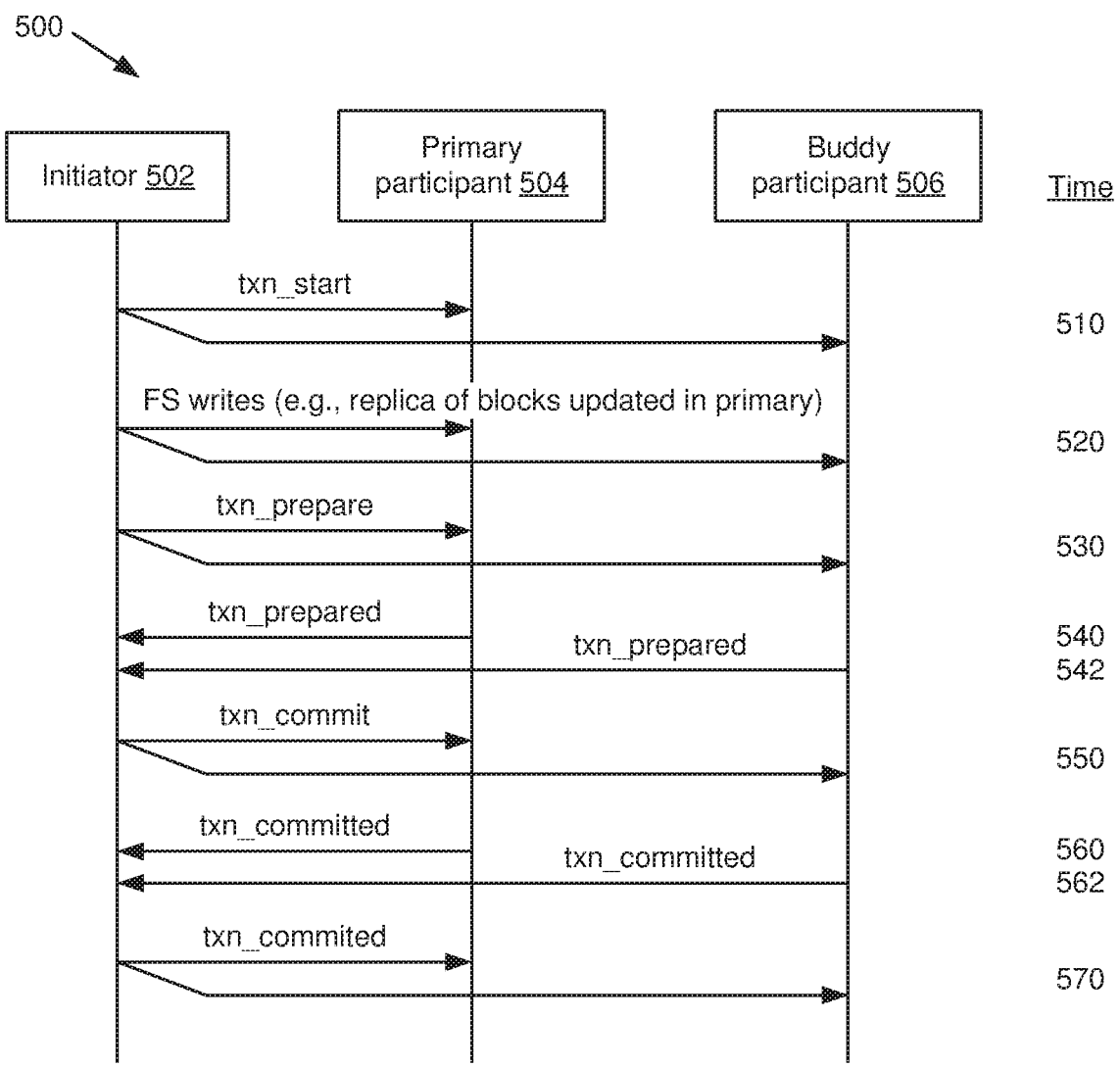
FIG. 5 is a diagram depicting an example messaging flow for mirroring a file system journal via a two-phase commit transaction in accordance with various aspects described herein.

Turning now to FIG. 5, a diagram 500 depicting an example messaging flow for mirroring a file system journal via a 2PC transaction in accordance with various aspects described herein is illustrated. The messaging flow illustrated by diagram 500 can be conducted between an initiator 502 that initiates updates to one or more data or metadata blocks (e.g., one or more blocks corresponding to a file, etc.), a primary participant 504 that is associated with the respective blocks to be updated and a primary journal corresponding to the transaction, and a buddy (secondary) participant associated with a buddy (secondary) journal that corresponds to the primary journal of the primary participant 504. While only one initiator 502, primary participant 504, and buddy participant 506 are shown in diagram 500 for simplicity of illustration, it should be appreciated that similar messaging flows to those illustrated by diagram 500 could also be used for a transaction involving multiple initiators 502, primary participants 504, and/or buddy participants 506. For instance, a similar messaging flow to that shown by diagram 500 could be utilized for a transaction involving multiple primary participants 504, each of which potentially being associated with one or multiple buddy participants 506, without departing from the scope of this description.

In an aspect, one or more buddy participants 506 can be assigned to a given primary participant 504 prior to the messaging flow shown by diagram 500 via a static buddy nomination scheme and/or by other means. For instance, for each storage node in the system identified by a device identifier X, the storage node of the system having the next highest device identifier (e.g., wrapped upwards) can be nominated as a buddy for the storage node. Other schemes could also be used. In a further aspect, the initiator 502 can fetch the generation indicator for each primary participant 504, e.g., as described above with respect to FIGS. 2-4, from GMP group information and/or other suitable information prior to the messaging flow shown in diagram 500.

As shown at time 510, the initiator 502 can send transaction start (txn_start) messages to the primary participant(s) 504 and the buddy participant(s) 506, respectively. In an aspect, the initiator 502 can send the txn_start messages to the primary participant(s) 504 and the buddy participant(s) 506 in parallel, e.g., as a common message directed toward both sets of participants 504, 506, and/or in separate messages. In a further aspect, the txn_start messages sent by the initiator 502 at time 510 can include the generation number and/or generation indicator for the primary journal, e.g., as obtained by the initiator 502 prior to time 510.

If the generation number sent by the initiator 502 at time 510 with the txn_start message differs from the generation number associated with one or more participants 504, 506, the transaction can be aborted pending resolution of the differences in the generation number. For example, if the generation number sent by the initiator 502 is lower than that of one or more of the participants 504, 506, the participants 504, 506 being associated with a higher generation number can return a restartable error. This could occur, e.g., due to a group change racing with the transaction, and as a result the initiator 502 can restart the transaction after fetching the updated GMP group change information (e.g., via OPRE-START logic). Alternatively, if the generation number sent by the initiator 502 is higher, it can be assumed that the primary participant 504 is in the process of incrementing its generation number. As a result, the txn_start messages can be serialized with the generation increment operation.

At time 520, the initiator 502 can send write and/or delta messages to the primary participant 504 that collectively include a replica of the blocks to be updated at the primary participant 504. For each message sent by the initiator 502 at time 520, the initiator 502 can also send a similar message with the same payload to the buddy participant 506.

Following transfer of the write and/or delta messages at time 520, subsequent resolution of the transaction can proceed per 2PCv2 protocol. For instance, the initiator 502 can send transaction prepare (txn_prepare) messages at time 230 to the primary participant(s) 504 and buddy participant(s) 506, which can in turn respond with transaction prepared (txn_prepared) messages at times 240 and 242, respectively. In response to receiving the txn_prepared messages, the initiator 502 can then send transaction commit (txn_commit) messages at time 550 to the primary participant(s) 504 and buddy participant(s) 506, which can in turn respond with transaction committed (txn_committed) messages at times 260 and 262, respectively. The messaging flow can then conclude at time 570, during which the initiator 502 sends txn_committed messages back to the primary participant(s) 504 and buddy participant(s) 506 in order to confirm the transaction.

Figure 6:
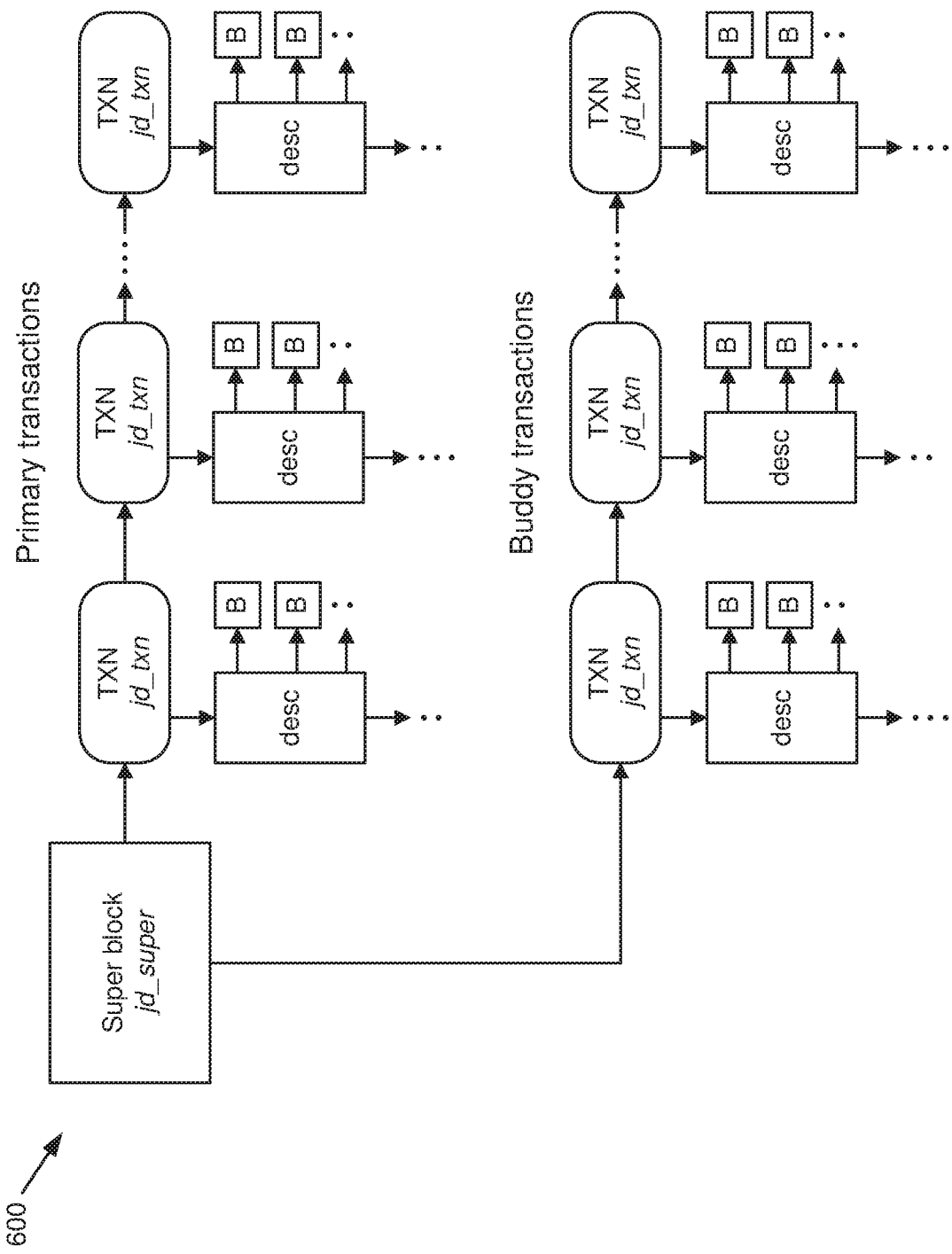
FIG. 6 is a diagram depicting an example structure that can be used for storing a file system journal in accordance with various aspects described herein.

Turning now to FIG. 6, diagram 600 depicting an example structure that can be used for storing a file system journal in accordance with various aspects described herein is illustrated. In an aspect, the journal device structure shown by diagram 600 can contain a super block (jd_super), which can include identifying information for the node(s) and/or drives (s) that correspond to the journal device. Respective transactions associated with the journal device can then be structured as respective linked lists of transaction blocks (jd_txn) that refer back to the super block.

As shown in diagram 600, a journal device can contain both primary transactions and secondary/buddy transactions. For instance, a physical journal device, can have a primary participant of a transaction and a buddy participant, of a different primary, for the same transaction. In an aspect, the primary and buddy structures can be logically separated, e.g., as shown in diagram 600, while still utilizing the same on-disk formats.

The jd_txn blocks shown in diagram 600 for both primary and buddy transactions can include metadata corresponding to respective associated transactions, such as the state of the transaction, the participants involved in the transaction, etc. As further shown in diagram 600, the jd_txn blocks can link to one or more journal descriptor blocks (desc), which in turn can include pointers to respective blocks (B) of the drives associated with the transaction.

In an aspect, primary and buddy transactions as shown in diagram 600 can utilize substantially the same structure, with the exception of a flag in the jd_txn blocks that identifies a transaction as a primary or secondary/buddy transaction. Additionally, the generation number of the primary journal associated with a given transaction and the node identifier of the primary participant can be included in the buddy transaction block.

In a further aspect, the journal descriptor blocks can be created when a buddy participant processes RBM messages from the initiator. Before responding to a txn_prepare message (e.g., as shown at time 530 in FIG. 5), the buddy participant can ensure one or more of the following:

1) The jd_txn and new journal descriptor blocks are written to the buddy journal.

2) The journal descriptor blocks are linked with the corresponding jd_txn block.

3) The jd_txn block is linked to the global transaction list of the buddy journal.

Figure 7:
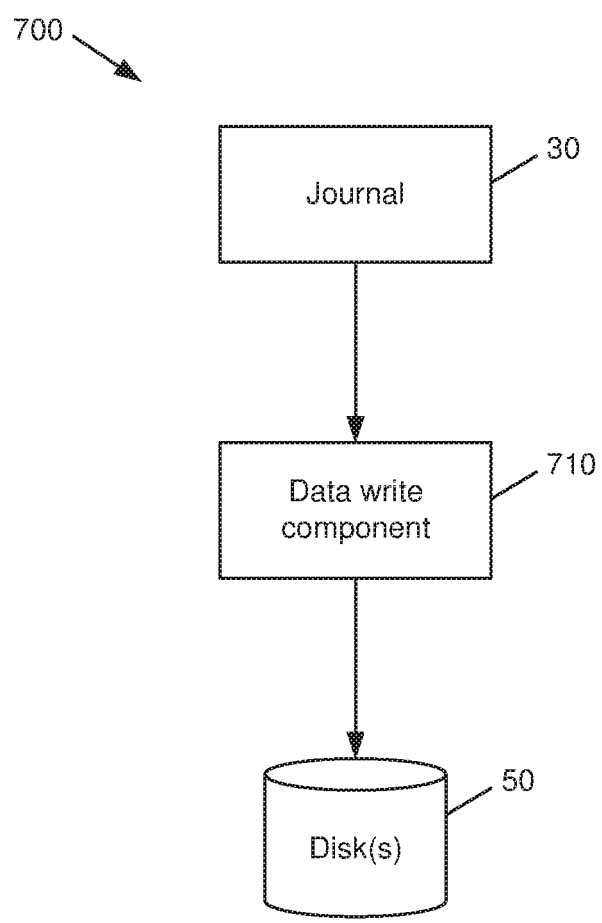
FIG. 7 is a block diagram of a system that facilitates performing a write operation based on information stored in a file system journal in accordance with various aspects described herein.

Turning now to FIG. 7, a block diagram of a system 700 that facilitates performing a write operation based on information stored in a file system journal 30 in accordance with various aspects described herein is illustrated. Repetitive description of like elements employed in other embodiments described herein is omitted for brevity. As shown in FIG. 7, system 700 can include a data write component 710 that can facilitate writing respective transactional file system updates, e.g., primary transactions as present in a journal 30 as structured according to the example shown in FIG. 6, to one or more disks 50 of an associated participant node. In an aspect, the data write component 710 can facilitate writing transaction data to the drive(s) 50 in response to respective transactional file system updates being successfully committed to the journal, e.g., according to the process shown in FIG. 5.

Figure 8:
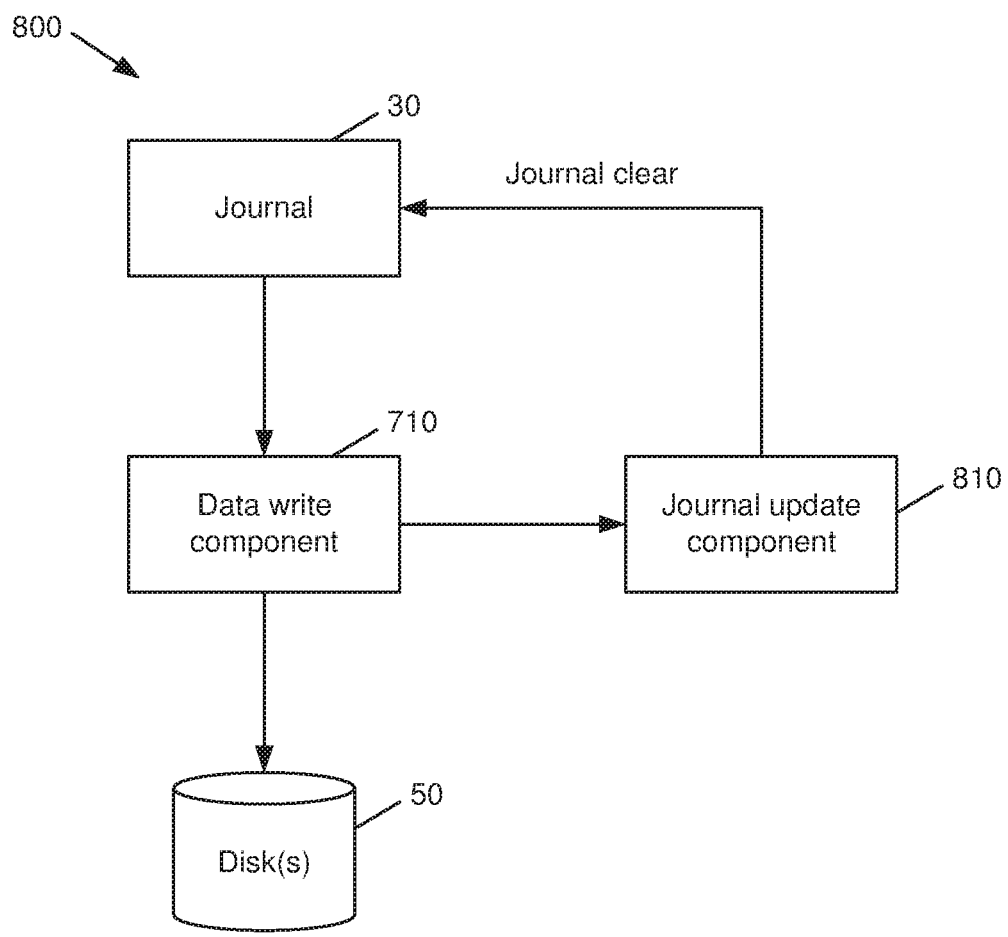
FIGS. 8-9 are block diagrams of respective systems that facilitate clearing of file system journal data subsequent to a write operation in accordance with various aspects described herein.

In an aspect, the data write component 710 can facilitate flushing one or more blocks involved in a given transaction as part of writing the related transactional file updates to the drive(s) 50. Subsequently, as shown by system 800 in FIG. 8, a journal update component 810 can be used to remove transactional file system updates from the journal 30 that correspond to transactions that have been successfully written to the disk(s) 50.

Figure 9:
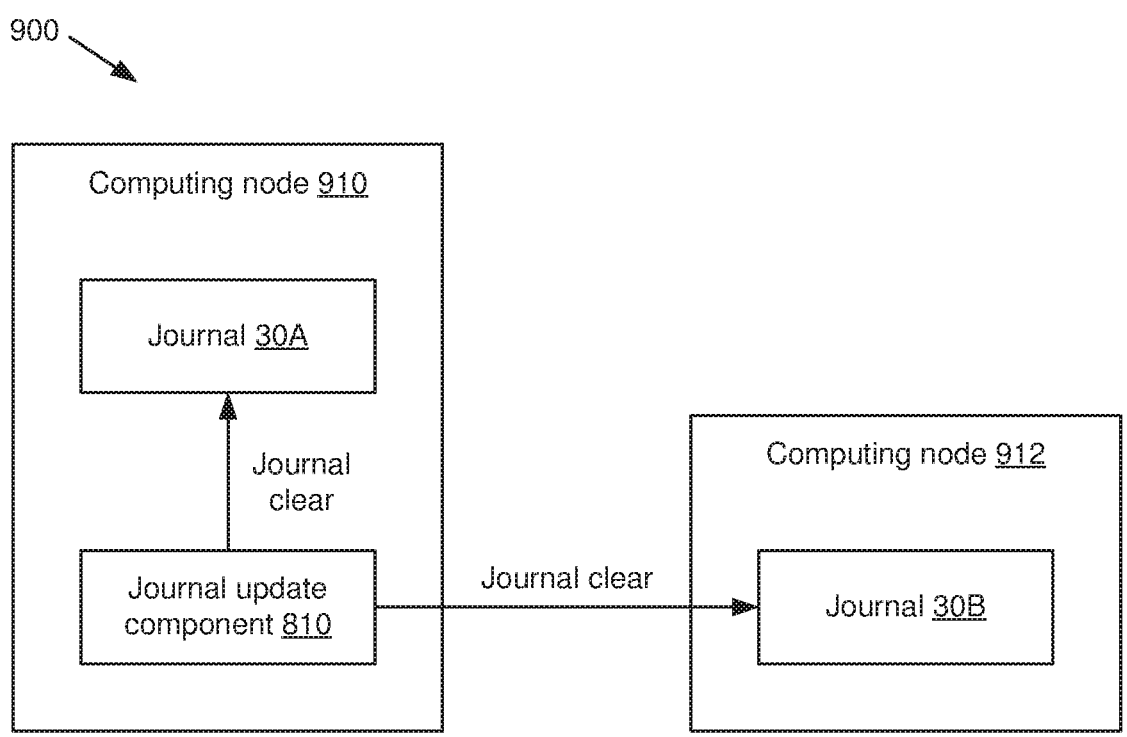

As additionally shown by system 900 in FIG. 9, upon successfully writing transactional file system updates to one or more disks associated with a primary computing node 910, a journal update component 810 associated with the primary computing node 910 can further facilitate the removal of the transactional file system updates corresponding to the transaction at a buddy journal 30B associated with a secondary/buddy computing node 912 in addition to the primary journal 30A at the primary computing node 910.

In an aspect, after flushing all of the blocks involved in a transaction, the primary computing node 910 can, e.g., via the journal update component 810, send the associated transaction identifier to the secondary computing node 912 (e.g., using an RBM message) for garbage collection. As stated above, the jd_txn block and any descriptor blocks of a transaction in the buddy journal 30B can be freed when the transaction is being unlinked on the primary computing node 910, e.g., due to all of the file system updates associated with the transaction being flushed to disk at the primary computing node 910. In an aspect, the journal update component 810 can use an RBM message to inform the secondary computing node 912 about the transaction unlink. Said message can, for instance, be an UPDATE message, since any RBM error associated with the message can result in a split.

Figure 10:
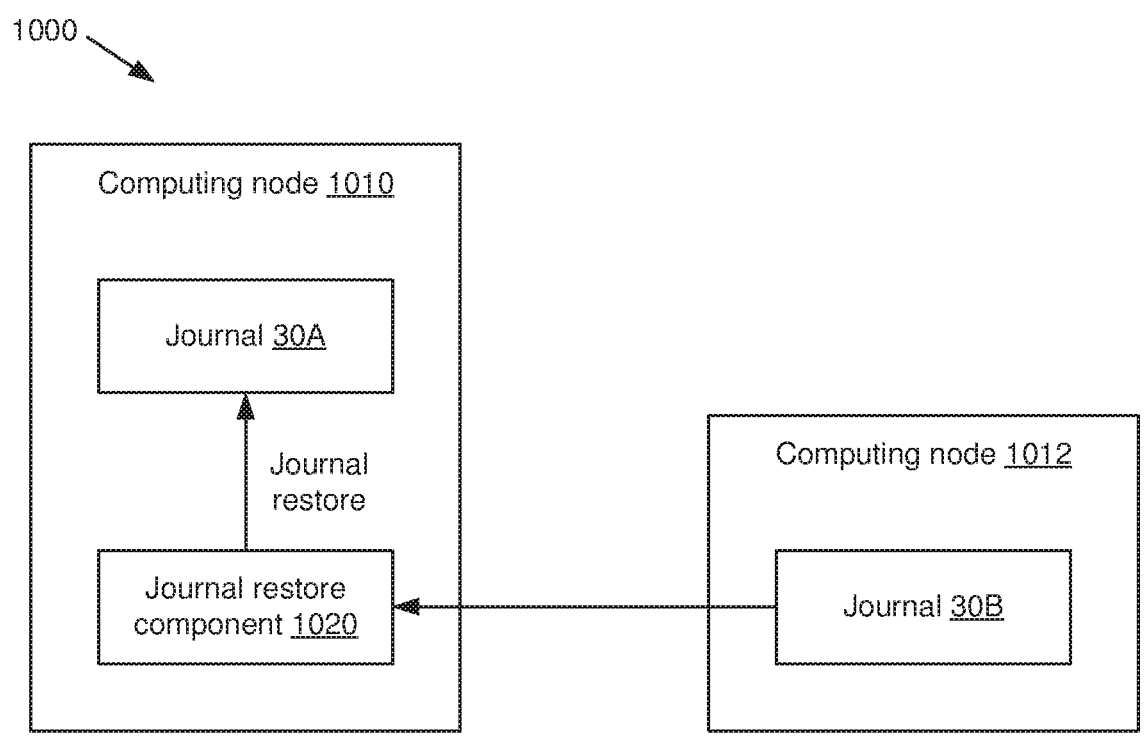
FIG. 10 is a block diagram of a system that facilitates restoring a file system journal from a mirrored copy in accordance with various aspects described herein.

Turning to FIG. 10, a block diagram of a system 1000 that facilitates restoring a file system journal 30A from a mirrored copy in accordance with various aspects described herein is illustrated. Repetitive description of like elements employed in other embodiments described herein is omitted for brevity. As shown in FIG. 10, system 1000 includes a journal restore component 1020 that can operate at a primary computing node 1020 to restore transactional file system updates at a journal 30A for the primary computing node 1020 in response to those updates becoming accessible, e.g., due to a failure of the journal 30A, using transactional file system updates as transferred (mirrored) to a buddy journal 30B at a secondary computing node 1012.

Figure 4:
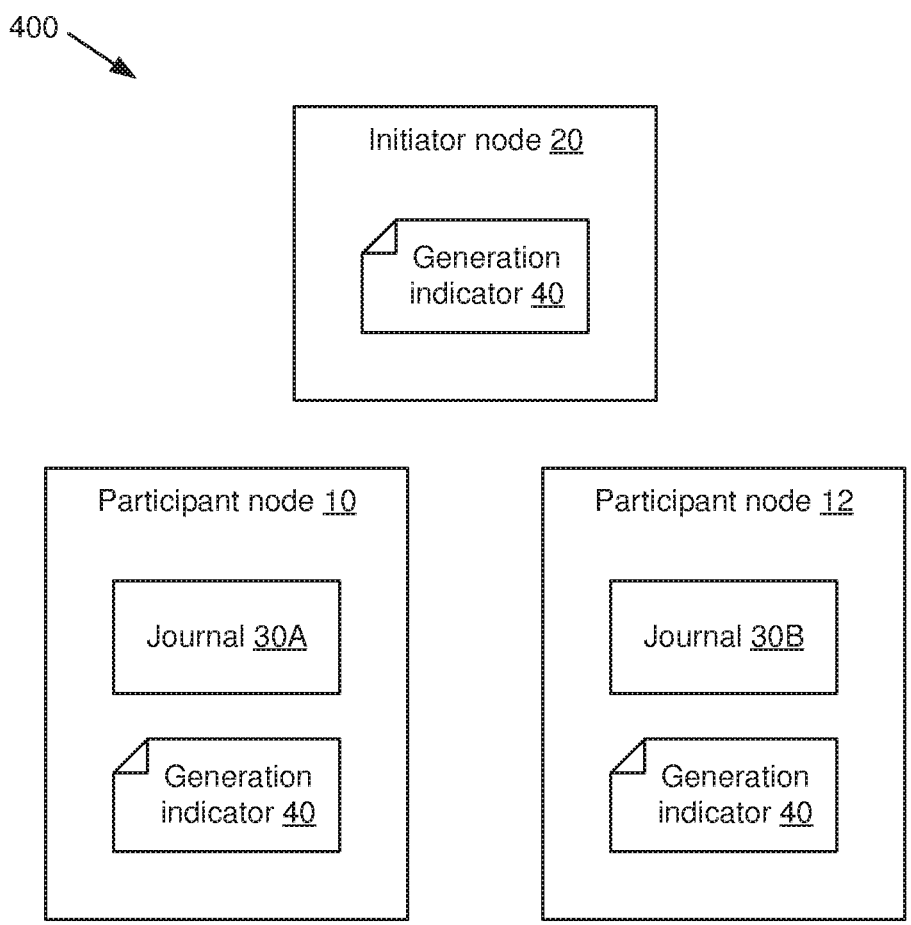
FIG. 4 is a block diagram of a system that facilitates maintenance of file system journal state information across respective nodes of a data storage system in accordance with various aspects described herein.

In an aspect, in the event of a journal failure on the primary computing node 1010, the journal restore component 1020 can recover the lost journal contents from the mirrored journal 30B on an associated secondary computing node 1012. For instance, the mirrored journal 30B can be used to rebuild the primary journal 30A, thereby allowing forward progress on any unresolved transactions and reconstructing the corresponding file system updates. In another aspect, the journal restore component 1020 can verify a generation number and/or other generation indicator (e.g., a generation indicator 40 as shown by FIG. 4) associated with the mirrored journal 30B on the secondary computing node 1012 against the generation number and/or other indicator stored at the primary computing node 1010, e.g., as stored in the NSB on the primary computing node 1010. This can be done, for example, to detect and handle journal restoration from stale secondary copies.

While not shown in FIG. 10, the secondary computing node 1012 can also utilize a journal restore component 1020 to persist the corresponding journal data structures and rebuild them across shutdown, power failure, resets, and/or other events using similar mechanisms as the journal restore component 1020 of the primary computing node 1010.

In another aspect, the journal restore component 1020 and/or other suitable components or subsystems of system 1000 can (e.g., via GMP) assign a unique node, e.g., computing node 1012 as shown in system 1000, to assume responsibility for a given transaction in the case of a failover as described above. This can be done, for example, to avoid conflicts between multiple computing nodes that may attempt to assume responsibility for the same transaction.

In an additional aspect, the primary computing node 1010, via the journal restore component 1020, can be able to sync-back and/or read back transaction states and corresponding file system updates. This can be accomplished by, e.g., taking a backup of the state of the buddy journal 30B utilizing a journal save procedure and restoring the buddy journal 30B on the primary computing node 1010 via a modified journal restore procedure that correctly initializes the journal superblock (e.g., as shown above in FIG. 6). Also or alternatively, this can be accomplished by syncing back on-wire, e.g., using RBM messages.

Figure 11:
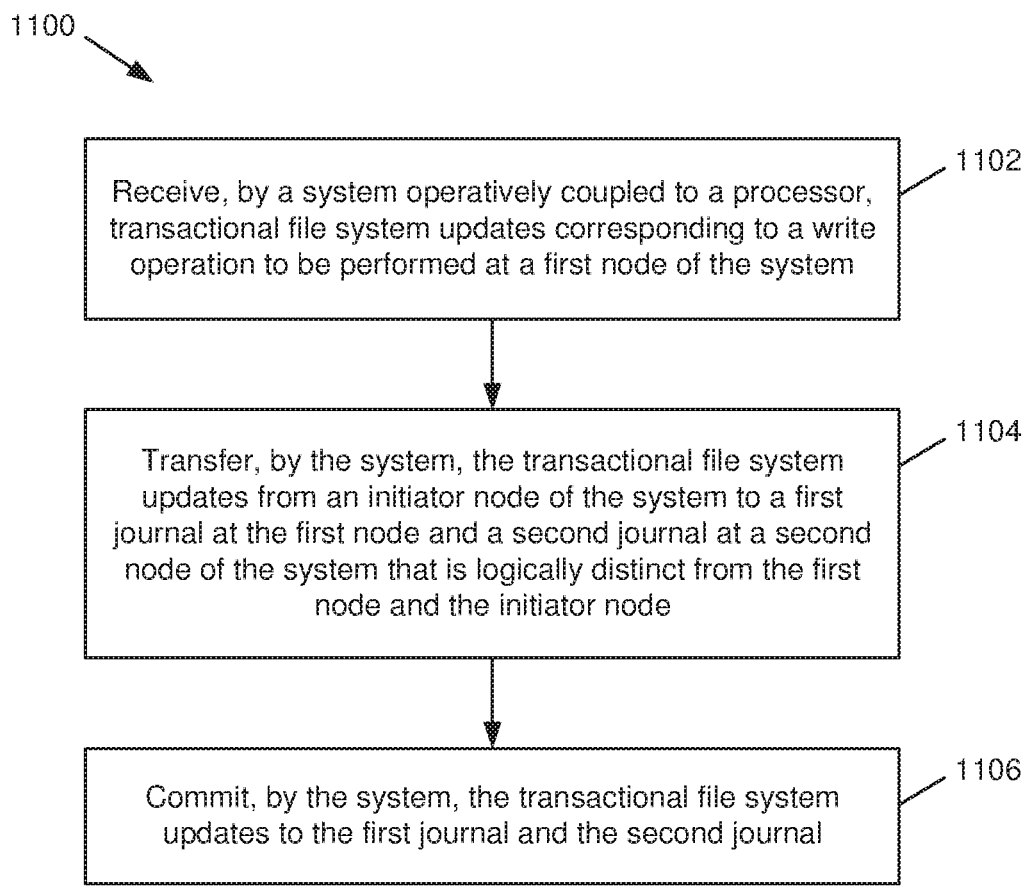
FIG. 11 is a flow diagram of a method that facilitates mirroring a file system journal in accordance with various aspects described herein.

Referring next to FIG. 11, a flow diagram of a method 1100 that facilitates mirroring a file system journal in accordance with various aspects described herein is illustrated. At 1102, a system operatively coupled to a processor can receive and/or otherwise obtain (e.g., by a write processing component 110) transactional file system updates corresponding to a write operation to be performed at a first node (e.g., a participant node 10) of the system.

At 1104, the system can transfer (e.g., by a journal transfer component 120) the transactional file system updates received at 1102 from an initiator node of the system (e.g., an initiator node 20) to a first journal (e.g., a journal 30A) at the first node and a second journal (e.g., a journal 30B) of a second node (e.g., a participant node 12) that is logically distinct from the first node and the participant node.

At 1106, the system can commit (e.g., by a journal commit component 130) the transactional file system updates transferred to the first journal and the second journal at 1104 (e.g., using a 2PC transaction or the like).

FIG. 11 as described above illustrates a method in accordance with certain aspects of this disclosure. While, for purposes of simplicity of explanation, the method has been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 12:
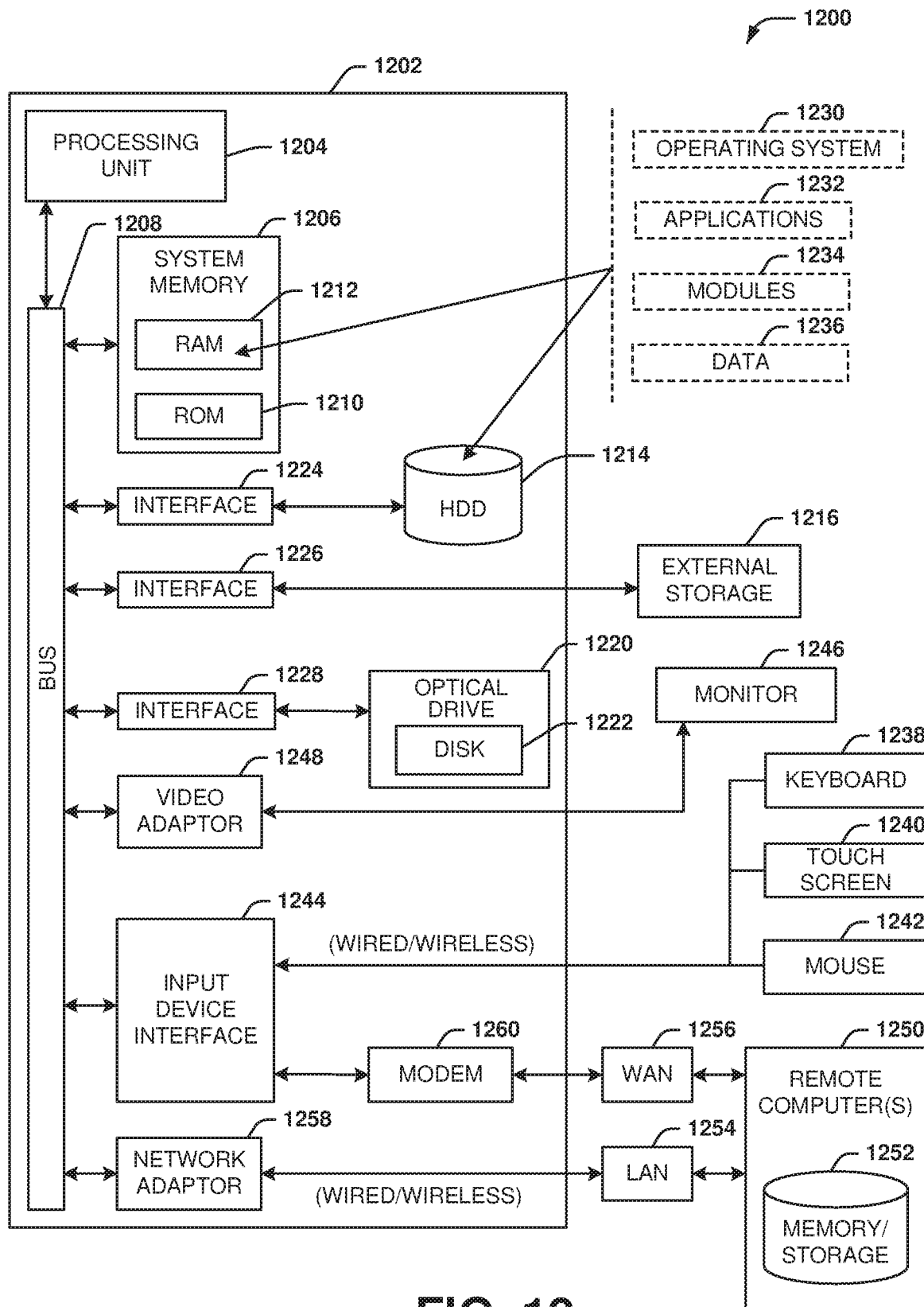
FIG. 12 is a diagram of an example computing environment in which various embodiments described herein can function.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD), a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
    a memory that stores computer executable components; and
    a processor that executes the computer executable components stored in the memory, wherein the computer executable components comprise:
        a write processing component that generates transactional file system updates corresponding to a write operation to be performed at a first participant node of the data storage system;
        a journal transfer component that conducts a first transfer of the transactional file system updates from an initiator node of the data storage system to a first journal at the first participant node and conducts, in parallel with the first transfer, a second transfer of the transactional file system updates from the initiator node to a second journal at a second participant node of the data storage system without the first participant node transferring any of the transactional file system updates to the second participant node, wherein the initiator node, the first participant node, and the second participant node are logically distinct computing devices; and
        a journal commit component that facilitates commitment of the transactional file system updates to the first journal and the second journal.

2. The data storage system of claim 1, wherein the computer executable components further comprise:
    a journal state component that obtains a generation indicator associated with the data storage system in response to generating the transactional file system updates corresponding to the write operation, wherein the journal transfer component transfers the generation indicator with the transactional file system updates to the first journal and the second journal.

3. The data storage system of claim 2, wherein the journal state component updates the generation indicator in response to a change in operational state of at least one node of the data storage system selected from a group comprising the initiator node, the first participant node, and the second participant node.

4. The data storage system of claim 2, wherein the generation indicator is a first generation indicator, and wherein the journal commit component aborts the commitment of the transactional file system updates to the first journal and the second journal in response to at least one of the first participant node or the second participant node being associated with a second generation indicator that is different from the first generation indicator.

5. The data storage system of claim 2, wherein the generation indicator is stored in a first data block of the first participant node and a second data block of the second participant node, and wherein the first data block and the second data block are distinct from the first journal and the second journal, respectively.

6. The data storage system of claim 1, wherein the journal commit component facilitates the commitment of the transactional file system updates to the first journal and the second journal via a two-phase commit (2PC) transaction.

7. The data storage system of claim 6, wherein the transactional file system updates comprise respective updates to one or more storage blocks associated with the first participant node and 2PC transaction information.

8. The data storage system of claim 1, wherein the computer executable components further comprise:
   a data write component that facilitates writing the transactional file system updates to one or more disks of the first participant node in response to the transactional file system updates being successfully committed to the first journal.

9. The data storage system of claim 8, wherein the computer executable components further comprise:
   a journal update component that removes the transactional file system updates from the first journal in response to the transactional file system updates being successfully written to the one or more disks of the first participant node.

10. The data storage system of claim 9, wherein the journal update component further removes the transactional file system updates from the second journal in response to the transactional file system updates being successfully written to the one or more disks of the first participant node.

11. The data storage system of claim 1, wherein the computer executable components further comprise:
   a journal restore component that restores the transactional file system updates as transferred to the first journal using the transactional file system updates as transferred to the second journal in response to the transactional file system updates becoming inaccessible on the first journal.

12. The data storage system of claim 1, wherein the initiator node, the first participant node, and the second participant node are associated with mutually distinct groups of storage devices.

13. A method, comprising:
   receiving, by a system operatively coupled to a processor, transactional file system updates corresponding to a write operation to be performed at a first node of the system;
   performing, by the system, a first transfer of the transactional file system updates from an initiator node of the system to a first journal at the first node;
   performing, by the system in parallel with the first transfer, a second transfer of the transactional file system updates from the initiator node to a second journal at a second node of the system without the first node transferring any of the transactional file system updates to the second node, wherein the initiator node, the first node, and the second node are logically distinct computing devices; and
   committing, by the system, the transactional file system updates to the first journal and the second journal.

14. The method of claim 13, further comprising:
   obtaining, by the system, a generation indicator associated with the system in response to receiving the transactional file system updates; and
   transferring, by the system, the generation indicator with the transactional file system updates to the first journal and the second journal.

15. The method of claim 13, further comprising:
   writing, by the system, the transactional file system updates to one or more disks of the first node in response to committing the transactional file system updates to the first journal and the second journal.

16. The method of claim 15, further comprising:
   removing, by the system, the transactional file system updates from the first journal and the second journal in response to writing the transactional file system updates to the one or more disks of the first node.

17. A non-transitory machine-readable medium comprising computer executable instructions that, when executed by a processor of a data storage system, facilitate performance of operations, the operations comprising:
   generating file system updates and transaction information corresponding to a write operation directed to a primary participant node of the data storage system;
   conducting a first transfer of the file system updates and the transaction information from an initiator node of the data storage system to a first journal at the primary participant node;
   conducting, in parallel with the first transfer, a second transfer of the file system updates and the transaction information from the initiator node to a second journal at a secondary participant node of the data storage system without transferring any of the file system updates or the transaction information from the primary participant node to the secondary participant node, wherein the initiator node, the primary participant node, and the secondary participant node are logically distinct computing devices; and
   committing the file system updates and the transaction information to the first journal and the second journal.

18. The non-transitory machine-readable medium of claim 17, wherein the operations further comprise:
   obtaining a generation number associated with the data storage system in response to receiving the file system updates and the transaction information; and
   transferring the generation number to the first journal and the second journal.

19. The non-transitory machine-readable medium of claim 17, wherein the operations further comprise:
   committing the file system updates and the transaction information to the first journal and the second journal via a two-phase commit transaction.

20. The non-transitory machine-readable medium of claim 17, wherein the operations further comprise:
   writing the file system updates and the transaction information to one or more drives at the primary participant node in response to committing the file system updates and the transaction information to the first journal and the second journal; and
   removing the file system updates and the transaction information from the first journal and the second journal in response to writing the file system updates and the transaction information to the one or more drives at the primary participant node.

* * * * *